(12) United States Patent
Mundy et al.

(10) Patent No.: US 11,225,429 B2
(45) Date of Patent: Jan. 18, 2022

(54) CONTINUOUS PRODUCTION OF HOLLOW INGOTS

(71) Applicant: Heraeus Conamic UK Limited, Tyne and Wear (GB)

(72) Inventors: Alan Mundy, Newcastle-upon-Tyne (GB); Hamed Aghajani, Newcastle (GB); Ian George Sayce, Tyne and Wear (GB)

(73) Assignee: HERAEUS CONAMIC UK LIMIIED, Tyne and Wear (GB)

( * ) Notice: Subject to any disclaimer, the term of this patent is extended or adjusted under 35 U.S.C. 154(b) by 121 days.

(21) Appl. No.: 16/691,909

(22) Filed: Nov. 22, 2019

(65) Prior Publication Data

US 2020/0165150 A1 May 28, 2020

(30) Foreign Application Priority Data

Nov. 23, 2018 (EP) .................................... 18207949

(51) Int. Cl.
*C03B 17/04* (2006.01)

(52) U.S. Cl.
CPC .................................. *C03B 17/04* (2013.01)

(58) Field of Classification Search
CPC ....................................................... C03B 17/04
USPC ....................................................... 428/34.4
See application file for complete search history.

(56) References Cited

U.S. PATENT DOCUMENTS

| 1,653,848 A * | 12/1927 | Grotta ................... B29C 48/907 65/86 |
| 1,766,638 A * | 6/1930 | Howard ................ B29C 48/903 65/63 |
| 2,310,474 A * | 2/1943 | Teichmann ............. C03B 17/04 65/89 |
| 2,852,891 A * | 9/1958 | George ................... C03B 5/021 65/85 |
| 3,666,583 A * | 5/1972 | Pei ........................ C03B 33/085 65/34 |
| 3,937,623 A | 2/1976 | Kononko et al. |
| 6,763,682 B1 | 7/2004 | Sayce et al. |
| 6,783,824 B2 * | 8/2004 | Steffier .................. B23P 15/008 428/34.1 |
| 7,305,852 B2 | 12/2007 | Gotoh et al. |
| 8,141,390 B2 * | 3/2012 | Morrill, Jr. ............. B29C 48/92 65/382 |
| 9,242,887 B2 | 1/2016 | Gromann et al. |
| 2006/0130525 A1 * | 6/2006 | Buellesfeld ............. C03B 17/04 65/108 |
| 2017/0349474 A1 | 12/2017 | Allen et al. |

FOREIGN PATENT DOCUMENTS

CN 103771690 A 5/2014
SU 740718 6/1980

* cited by examiner

*Primary Examiner* — Christopher M Raabe
(74) *Attorney, Agent, or Firm* — Stradley Ronon Stevens & Young, LLP

(57) ABSTRACT

The present invention relates to a continuous method for the production of hollow quartz-glass ingots and an apparatus for said method, whereby the hollow quartz-glass ingots are cooled on the internal surface.

9 Claims, 3 Drawing Sheets

Figure 2 (A) and (B):
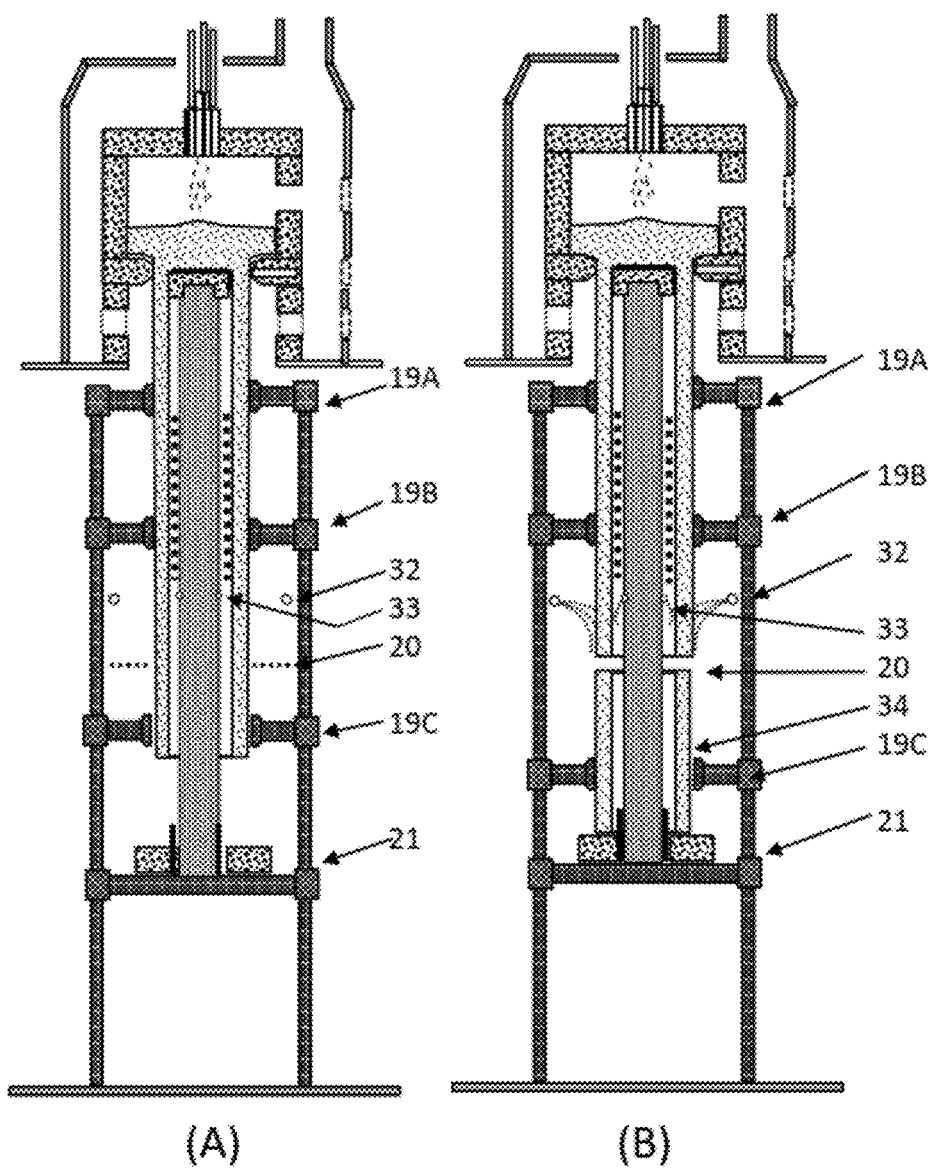
(A)  (B)

Figure 2 (C) and (D):
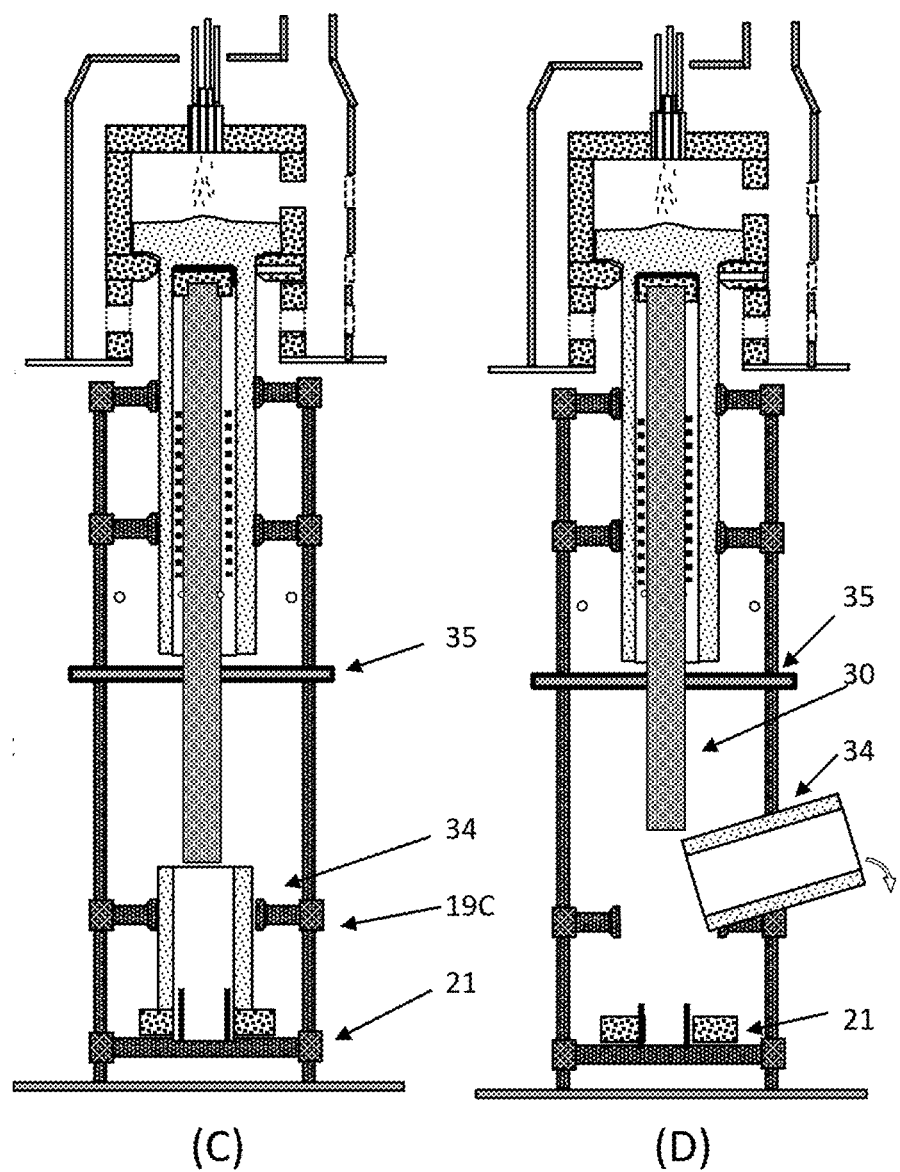

CONTINUOUS PRODUCTION OF HOLLOW INGOTS

FIELD OF THE INVENTION

In a first aspect the present invention relates to a continuous method for the production of hollow quartz-glass ingots. In a second aspect the present invention relates to an apparatus for the production of hollow quartz-glass ingots which is used in the claimed method and in a third aspect the present invention relates to a hollow quartz-glass ingot which is prepared according to the claimed method.

BACKGROUND

Methods and apparatus for the continuous production of hollow quartz-glass ingots are known from prior art. In these continuous processes, quartz is fused within a refractory crucible by supplying heat and the fused quartz is withdrawn through a die orifice in the centre of which is mounted a mandrel. Thereafter, the ingot is lowered gradually at a constant speed, and the fused silica is quenched thereby forming a hollow columnar ingot or tube. Respective processes are, for example, disclosed in U.S. Pat. No. 9,242,887 and CN 103 771 690. Usually the tubes (hollow ingots) provided by such methods have a relatively small diameter and a thin wall. In CN 103 771 690, for example, tubes (hollow ingots) are produced having a diameter of 300 to 320 mm and a wall thickness of 10 to 12 mm.

One problem which arises with the continuous production of hollow quartz-glass ingots having a large outside diameter, in particular having an outside diameter of more than 350 mm, and thicker walls, is the formation of cracks in the ingot as it is cut to length beneath the furnace. The problems of such cracks in the quartz-glass ingot are not solved with the teaching of the above-mentioned prior art references.

One further prior art which focuses in particular on the production of large hollow quartz-glass ingots is U.S. Pat. No. 7,305,852 and discloses a process in which a crucible is filled with fused quartz, and a limited amount of a rod, plate or hollow ingot is drawn after completing the fusion process. The furnace used in this process is not used continuously, but operates in batches, offering the possibility of filling the crucible with fused quartz, and then withdrawing the glass and emptying the furnace after fusion. Due to the thermal fluctuations this discontinuous operation causes, the ingots of the intended size could not be cut on-line without severe cracking. Moreover, respective batch processes have economical disadvantages.

US 2017/0349474 A describes the fusion of a conventional glass melt, and the manufacture of sections of ingots. The process disclosed is not intended to provide a continuous production of ingots which requires the process step of on-line cutting of the ingot after formation.

SU 740718 discloses an apparatus for the preparation of a hollow quartz-glass ingot. In detail. SU 740718 represents a modification of the conventional process for fusion of quartz to permit drawing of a tube from a melt of fused quartz, but with improved control of the flow of glass and internal diameter of the tube. This involves a mandrel, supported from above, but using the internal heat exchanger to control the viscosity of the glass as it flows through the die. There is no indication of the tube sizes under consideration. Moreover, the tube prepared by said prior art process are conventionally be allowed to cool naturally below the die, and there is no indication that any steps were taken to cool the glass progressively internally. Moreover, problems arising with the challenge of repeated crack-free cutting of large sized, thick-walled ingots of quartz-glass ingots are not described.

Starting from this prior art situation, it is the object to provide a method for the production of hollow quartz-glass ingots which can be prepared without the above-mentioned disadvantages.

In particular, it is the object to provide a method for the production of hollow quartz-glass ingots which can be prepared and cut continuously.

More particularly, it is the object to provide a method for the production of hollow quartz-glass ingots which can be prepared and cut continuously, and which have a large outside diameter, and a relatively thick wall.

More particularly, it is the object to provide a method for the production of hollow quartz-glass ingots which can be prepared and cut continuously without cracking and which have a large outside diameter and relatively thick wall.

Moreover, it is the object to provide an apparatus which can be used to produce and cut hollow quartz-glass ingots continuously without cracking, whereby the hollow quartz-glass ingots have a large outside diameter and a relatively thick wall. This apparatus should be suitable for carrying out the claimed method.

SUMMARY OF THE INVENTION

In one aspect, there is provided a method for producing a hollow quartz-glass ingot, characterized by the following process steps: a. providing a softened quartz-glass mass in a crucible or refractory tank; b. vertically drawing off the softened quartz-glass mass through a die in which is mounted a mandrel, to provide a hollow quartz-glass ingot; and c. on-line cutting of the hollow quartz-glass ingot to a specific length, characterized in that the internal surface of the hollow quartz-glass ingot is cooled by active means after vertically drawing off the softened quartz-glass mass in step b. and before on-line cutting in process step c.

In another aspect, there is provided an apparatus for the continuous production of hollow quartz-glass ingots, wherein the apparatus comprises: (a) a crucible or refractory tank for providing a softened quartz-glass mass having a die orifice in the bottom of the crucible or refractory tank; (b) a mandrel vertically drawing off the softened quartz-glass mass through a die to provide a hollow quartz-glass ingot; and (c) a cutting section for on-line cutting of the hollow quartz-glass ingot to a specific length, characterized in that the apparatus comprises an active means for cooling the internal surface of the hollow quartz-glass ingot prior to the cutting station.

BRIEF DESCRIPTION OF THE DRAWINGS

FIGS. 2A, 2B, 2C, and 2D illustrate various stages of the cutting and removal of ingot sections according to an embodiment of the method disclosed herein.

DETAILED DESCRIPTION OF EMBODIMENTS OF THE INVENTION

Embodiment: Continuous Method Producing Hollow Ingots

Figure 1:
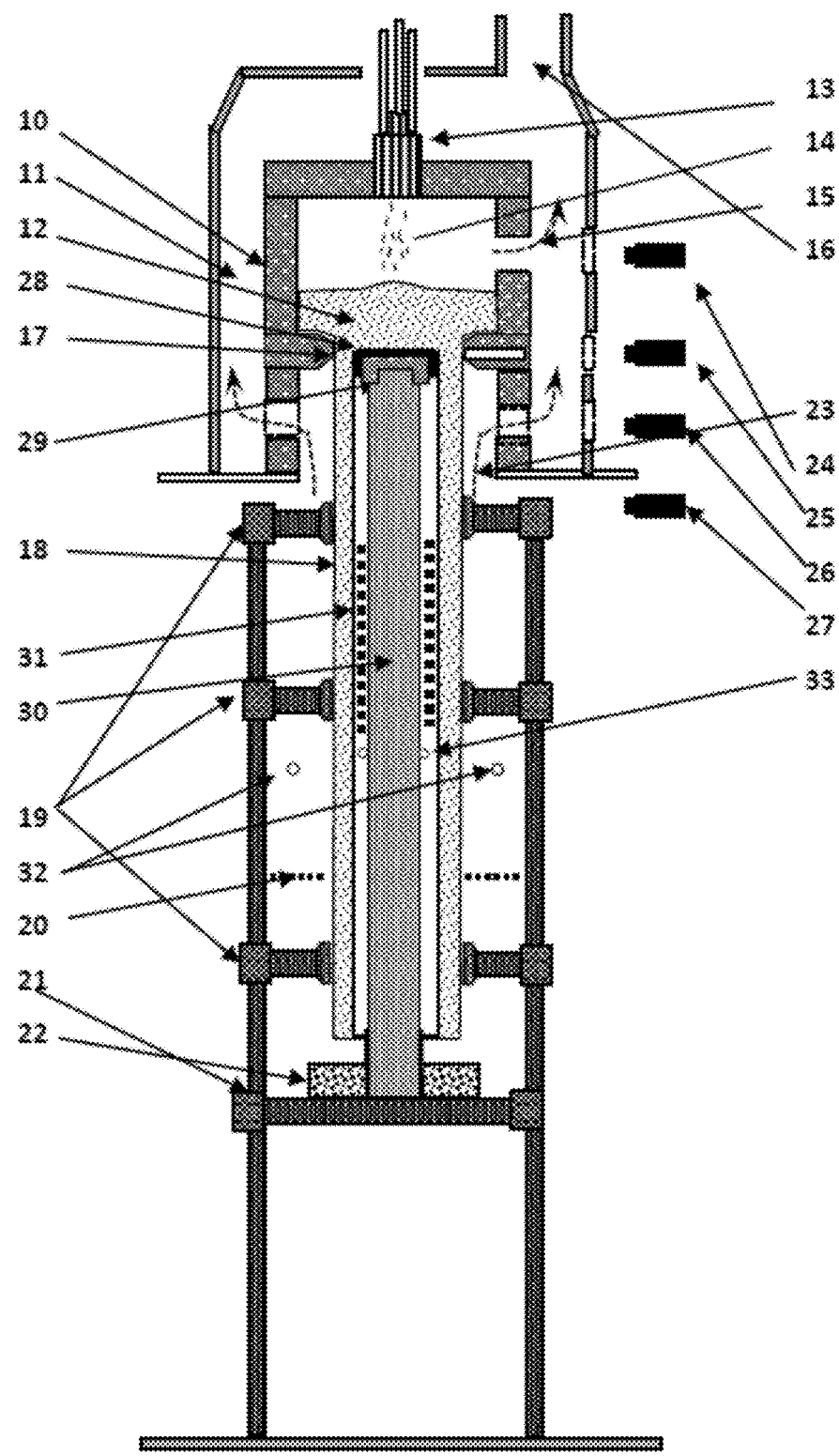
FIG. 1 is an illustration of an embodiment of a furnace suitable for practicing the method disclosed herein.

In one aspect, the objects of the present invention are solved by a continuous method for producing a hollow quartz-glass ingot, comprising the following process steps:

a. providing a softened quartz-glass mass in a crucible or refractory tank;
b. vertically drawing off the softened quartz-glass mass through a die in which is mounted a mandrel, to provide a hollow quartz-glass ingot; and
c. on-line cutting of the hollow quartz-glass ingot to a specific length.

The claimed method is characterized in that the internal surface of the hollow quartz-glass ingot is cooled by active means after vertically drawing off the softened quartz-glass mass in step b. and before on-line cutting in process step c.

In the context of the present invention it was found out that
(1) cracks arising during the production of hollow quartz-glass ingots having a large external diameter and a relatively thick wall and, in particular,
(2) cracks arising during the step of cutting such hollow quartz-glass ingots can be attributed to elastic stress throughout the ingot at the time of cutting. Without being bound by a particular theory, the elastic stress of the ingot can be traced back to different temperature profiles on the external and internal surfaces of the ingot after being extruded in step b. The external surface of the ingot is cooled by natural means, such as radiation and convection of air, or active cooling means, whereas the internal surface of the hollow ingot remains relative hot, creating different temperature profiles on the external and internal surface of the hollow ingot after extrusion. This different temperature profile on both surfaces may be responsible for the elastic stress in the extruded ingot which leads later to cracks in the ingot during the cutting process step. The formation of cracks in the ingot during the cutting process step may be enhanced by the sudden introduction of water to the outside surface of the ingot from the cutting tool, at the time of cutting.

Now, it was found that it is possible to reduce the elastic stress by a more homogenous cooling of the hollow quartz-glass ingot, whereby it is essential that the hollow quartz-glass ingot is not only cooled on the external surface (which occurs more or less automatically by natural means or by active cooling means) of the ingot, but also on the inner surface of the hollow ingot. The cooling step on the inner surface of the hollow ingot is achieved by an active cooling using means which are described in more detail below.

Even though the internal cooling of a tube of glass during its formation is described in U.S. Pat. No. 3,937,623 during the manufacture of a compound glass (at lower temperature), the glass tube-making process of this prior art reference is completely different as compared to the production of hollow quartz-glass ingots according to the present embodiments. For this reason, the teaching of U.S. Pat. No. 3,937,623 cannot be transferred to the method according to the present embodiments. In particular, the process described in U.S. Pat. No. 3,937,623 is not a process of flame fusion to make a large and heavy-wall quartz glass ingot.

In the processing of large sized hollow quartz-glass ingots as they emerge from a continuous furnace, cracks frequently arise during the cutting process. By applying the claimed method of an active cooling of the internal surface of the hollow ingot, cracks which normally occur during said cutting step can be reduced or preferably fully avoided.

By applying the cooling of the ingot as presently defined, the elastic stress of the ingot can be reduced so that almost no or no extended crack occurs during the cutting process of the hollow quartz-glass ingot.

The elastic stresses in the glass comprise a combination of both compressive and tensile stresses. Excessive tensile stress is a potential cause of cracking. By applying the cooling of the ingot as defined in one or more of the presently described embodiments, the elastic tensile stress, in the ingot is reduced to preferably less than 5 MPa, more preferably less than 4 MPa, most preferably less than 2 MPa.

By applying the present method, it becomes possible to fuse quartz and continuously to draw large diameter hollow ingots and repeatedly to cut the quartz glass ingot without or at least with a reduced number of severe cracks. This allows an economical production of hollow quartz-glass ingots.

In the following, measures for the cooling of the external and internal surfaces of the hollow quartz-glass ingots are described in more detail.

As already addressed above, the external surface of the hollow quartz-glass ingot after its preparation is automatically cooled, for example, by radiation and convection of surrounding air.

However, in one embodiment it is also possible that the external surface of the hollow quartz-glass ingot is additionally cooled by enhancing active means. Such an enhancing active cooling of the external surface is, for example, achieved by a cooling gas or cooling fluid applied on the external surface of the hollow quartz-glass ingot. A respective suitable cooling gas is air, an inert gas, such as nitrogen, or a reducing gas, such as a hydrogen/nitrogen mixture. A respective suitable cooling fluid is water which can be applied, for example, as a water spray. Furthermore, active convection of surrounding air and/or radiation can be applied to cool the external surface of the ingot.

In one embodiment, it is possible that more than one active cooling means is applied on the external surface of the ingot, such as applying a cooling gas, a cooling fluid, active convection and/or radiation.

One embodiment which uses more than one active cooling means on the external surface of the ingot is a combination of a high velocity flow of a cooling gas with a mist of water droplets as a cooling fluid.

Furthermore, it is also possible that the external surface of the ingot is cooled by a two-step cooling method, wherein at first a cooling is carried by convection and/or radiation and at second by means of directing a flow of a cooling gas or by spraying a cooling fluid on the external surface of the quartz-glass ingot.

By applying one or more of the above-mentioned cooling means, either automatically or active, the external surface of the hollow quartz-glass ingot is cooled to a temperature of the external surface of less than 400° C., more preferably less than 350° C., most preferably less than 250° C., prior to the on-line cutting in process step c.

Preferably, the internal surface of the hollow quartz-glass ingot is cooled by active means. Respective means are described later below.

By applying an active cooling of the internal surface of the ingot, a temperature of the inner surface of preferably less than 400° C., more preferably less than 300° C., most preferably less than 250° C. prior to the application of the external active cooling means which is initiated prior to the on-line cutting in process step c.

This additional cooling reduces the temperature of the internal surface to approximately 100° C.

The cutting of the ingot is carried out in the claimed method in a cutting station (also called cutting zone or cutting section) and this cutting station is provided in a region where the cut is applied, generally at a fixed distance below the die, and typically the cutting station is spaced away from the die along the hollow quartz-glass ingot of preferably at most 4000 mm, more preferably at most 2500 mm, most preferably at most 1800 mm. The above-mentioned temperatures of the external and internal surface of the ingot are preferably achieved at the cutting station of the ingot.

It was additionally found out that the above-mentioned specific temperatures of the external and internal surfaces are preferably arranged before the cutting Step c.

Moreover, it is preferred that the temperature difference between the inner surface and the outer surface of the hollow quartz-glass ingot before the cutting Step c. is preferably less than 250° C., more preferably less than 220° C., most preferably less than 180° C.

By applying the temperature relationships between the inner surface and the outer surface of the hollow quartz-glass ingot in particular at the cutting section, the elastic stress in the ingot can be reduced such that no or at least no severe cracks occur, in particular during the cutting of the ingot.

In the following, the specific method steps for the production of the hollow quartz-glass ingot are described in detail:

In the process step a. the softened quartz-glass mass as the starting material is provided in a crucible or refractory tank.

Thereby, the refractory tank or the crucible is provided usually in a furnace which allows heating and containment of the quartz-glass mass. The starting material is usually fed into the refractory tank or the crucible as a silicon source, selected from the group of quartz, silica powder or at least one silicon-containing precursor.

In case of a quartz or silica powder, the starting source is either a crystalline or an amorphous silica powder.

In case of a silicon-containing precursor, the starting material is usually a halogen-free silicon-precursor, in particular a siloxane compound, such as octamethylcyclotetrasiloxane.

It is possible that the silicon source is doped by addition of at least one additional element, in particular by addition of the least one oxide compound.

The silicon source is fed into the refractory tank or the crucible usually from above and is typically fed into the refractory tank or the crucible through one or more burners. Accordingly, the burner(s) is/are preferably located in the roof of the furnace.

The burner is usually supplied with at least one combustible gas and oxygen, whereby the combustible gas can be selected from the group consisting of hydrogen, natural gas or a hydrocarbon gas, and a mixture thereof.

By feeding the silicon source into the crucible or refractory tank through the burner, the silicon source is heated by the burner in flight and arrives on the melt surface where it fuses to glass. Moreover, the burner projects a flame or flames downward onto the surface of the melt of the silicon source which helps to melt the starting material.

In the next step b, the fused silica is extruded vertically from the furnace through an orifice in the form of a die and mandrel assembly, which is usually located in the base of the furnace and, thus, opposite the burner resulting in a hollow quartz-glass ingot.

The extruded silica is provided in the form of a hollow quartz-glass ingot by the aid of a refractory mandrel being located in the die orifice. Thereby, the internal dimension of the hollow quartz-glass ingot is defined by the dimension of the refractory mandrel.

The mandrel is typically supported by a mandrel support column from below.

The fused silica of the crucible or refractory tank being extruded from the furnace through the die orifice solidifies on the external surface after cooling resulting in a hollow quartz-glass ingot.

The external size and the form of the ingot are defined by the external shape of the die orifice being located in the base of the furnace.

Usually, the external diameter of the hollow quartz-glass ingot extruded in process step b. is greater than 400 mm, more specifically greater than 450 mm, more specifically greater than 500 mm. These dimensions are not limiting because the presently described embodiments can be reduced to practice with different external diameters of the ingot. The afore-mentioned diameters are actually determined by the requirements of the economic market.

Furthermore, the internal diameter of the hollow quartz-glass ingot is usually greater than 250 mm, more specifically greater than 290 mm, more specifically greater than 330 mm. Once again, these dimensions are not limiting because the presently described embodiments can be reduced to practice with different external diameters of the ingot. The afore-mentioned diameters are actually determined by the requirements of the economic market.

However, the wall thickness of the hollow quartz-glass ingot is specifically greater than 100 mm, more specifically greater than 125 mm, more specifically greater than 150 mm.

Thereafter, the hollow quartz-glass ingot is cooled on the external and internal surface as mentioned above to reduce the elastic stress in the ingot prior art the cutting step c.

It is preferred that the temperature difference between the internal and external surfaces of the ingot is less than 300° C., more preferably less than 280° C., more preferably less than 260° C., at the cutting station.

After the afore-mentioned temperatures of the external and internal surfaces are realized and preferably the elastic stress in the ingot is reduced to the afore-mentioned values, the hollow quartz-glass ingot is cut by a water-cooled saw in step c. in a cutting station.

The cutting station is beneath the die for drawing off the hollow quartz-glass ingot out of the crucible or refractory tank and is spaced away from the die along the hollow quartz-glass ingot of preferably at most 4000 mm, more preferably at most 2500 mm, most preferably at most 1800 mm.

The temperature on the external and internal surface of the ingot in the cutting station can be measured by any suitable means such optical pyrometers and/or thermocouples.

The hollow quartz-glass ingot being extruded through the die in step b. extends downward from the die orifice and is supported by means. In a preferred embodiment, the means for supporting the hollow quartz-glass ingot being extruded are one or more clamps mounted on carriages, whereby the clamps mounted on the carriage move downward from the die orifice at a speed appropriate to follow the fused silica extruded from the die orifice.

The clamps mounted on the carriage and the hollow quartz-glass ingot move downward preferably with a pre-defined speed such that the softened quartz-glass mass in the furnace (i.e., the crucible or refractory tank) is maintained at a basically constant level.

The cutting and removal of the ingot section being cut (cut ingot section) should be undertaken without removing the mandrel from the die orifice in order to allow a continuous process.

For this reason, the hollow quartz-glass ingot is drawn downwards until a first pre-defined position of the ingot is reached. At this first pre-defined position, the extruded hollow quartz-glass ingot reaches a bottom carriage where it becomes necessary to cut off a section of the ingot. The part of the hollow quartz-glass ingot which will be cut off is preferably still supported by one of more clamps.

The cutting operation takes place at the cutting station, and is preferably configured by a saw, more preferably by a water-cooled saw, in particular, a heavy-duty water-cooled chain or wire saw. The cutting medium of the saw is preferably a metal-bonded diamond.

At the cutting station, the hollow quartz-glass ingot is cut circumferentially by means of the saw. Moreover, it is preferred that the external surface of the hollow quartz-glass ingot is cooled by an external water spray before cutting in the cutting station. Furthermore, for hollow ingots of the larger sizes, and or thicker walls, it may be useful to supplement the existing internal cooling of the ingot (e.g., by the water-cooling coil around the mandrel), by further cooling, e.g., by water cooling sprays impacting on the inner surface of the mandrel, in order to bring both inner and outer surfaces to acceptable temperature.

After the hollow quartz-glass ingot is cut off, the bottom section of the ingot is lowered sufficiently. This allows the optional insertion of one or more mandrel support bars which serve to keep the mandrel in place while the bottom carriage and cut ingot section are lowered to a second pre-defined position (e.g., floor level), being lower than the first pre-defined position.

After the cut ingot section is lowered to the second pre-defined position, it becomes possible to off-load and remove the cut ingot section.

Since the hollow quartz-glass ingot being cut can be removed out of the cutting section without removing the mandrel from the die orifice, a continuous process for the production of ingots becomes possible.

Before the cut ingot section is removed, the clamps attached to the cut ingot section are preferably released.

After the cut section of the hollow quartz-glass ingot is removed from the second pre-defined level (floor level), the lowest clamp (FIG. 2, 19C) is preferably raised to the main body of the hollow quartz-glass ingot and re-attached to the main body of the hollow quartz-glass ingot. The bottom carriage (FIG. 2, 21) may then be raised to re-engage with the lower end of the mandrel support column, whereby the mandrel support bar(s) are removed from the mandrel, and the operation resumes until the next cut is required.

Since the cut section of the hollow quartz-glass ingot is lowered to the floor level, the cut section of the hollow quartz-glass ingot can be removed easily for further processing.

As already pointed out above, it is essential for the claimed method that the internal surface of the hollow quartz-glass ingot is cooled by active means. This essential internal cooling can be carried out by any suitable means of cooling. Examples are outlined in the following:

In a first embodiment, the cooling means might be constituted by a coil arranged around the mandrel support column and comprising a cooling fluid.

In a second embodiment, the cooling means of the mandrel are designated by a cooling fluid inside the mandrel support column on which the mandrel is mounted.

In these two embodiments, the cooling fluid might be water.

In a third embodiment, the cooling means might be constituted by a gas flow of an inert gas, such as nitrogen or argon, in the inner cavity of the hollow quartz-glass ingot.

In a fourth embodiment, the cooling means might be constituted by a water spray or an atomized mist of multiple jets of water projected on the inner surface of the ingot.

Presently, the afore-mentioned first, third and fourth embodiments are particularly preferred.

Furthermore, the afore-mentioned first and fourth embodiments are particularly preferred.

Furthermore, the afore-mentioned first embodiment is particularly preferred.

More than one of these embodiments may be used together, and the first, third and fourth embodiments are particularly preferred for a combination of internal cooling means.

More than one of these embodiments may be used together, and the first and fourth embodiments are particularly preferred for a combination of internal cooling means.

The active cooling means of the fourth embodiment are preferably applied, alone or in combination with the active cooling means according to the first to third embodiment, during a period immediately before the ingot cutting procedure is initiated.

In case of the fourth embodiment for cooling the internal surface of the hollow quartz-glass ingot is applied, water jets are usually arranged in or attached to the mandrel. For the point of efficiency, it has been found out that preferably 5 to 25, more preferably 6 to 20, most preferably 8 to 16, jets are sufficient to uniformly cooling the internal surface of the ingot. Thereby, it is preferred when the size of the holes in the mandrel or attached to the mandrel are between 0.10 and 2.00 mm, more preferably between 0.15 mm and 1.75 mm, most preferably between 0.20 and 1.50 mm.

In case of the fourth embodiment for cooling the internal surface of the hollow quartz-glass ingot is applied, the water jets have preferably a flow rate of water between 0.10 and 1.80 l/min, more preferably 0.15 and 1.70 l/min, most preferably 0.20 to 1.60 l/min, whereby the flow rate might increase in steps.

In case of the fourth embodiment for cooling the internal surface of the hollow quartz-glass ingot is applied, the temperature of the water stream or droplets leaving the jets to hit the inner surface of the hollow ingot might between 5 and 65° C.

The cooling system in each of the afore-mentioned embodiments is usually arranged 300 to 2300 mm, more preferably 400 to 2200 mm, most preferably 500 to 2000 mm, above the ingot cutting station.

The time period of applying the water spray on the internal surface might differ from case to case, but usually 10 to 480 min, more preferably 20 to 420 min, most preferably 30 to 360 min, are sufficient to reduce the elastic stress of the ingot prior to cutting.

Usually, the internal and external cooling of the surfaces are continued until the cutting of the ingot is about to start.

In the following, one preferred embodiment is described by reference to FIGS. 1 and 2:

In these figures, the following reference signs are used:
10 Refractory Tank
11 Furnace Chamber
12 Melt
13 Burner
14 Powder feed
15 Exhaust port 16 Chimney
17 Die orifice
18 Hollow ingot
19 Carriages and clamps
20 Cutting station
21 Bottom carriage
22 Refractory bricks
23 Cooling air
24 Pyrometer 1
25 Pyrometer 2
26 Pyrometer 3
27 Pyrometer 4
28 Mandrel cap
29 Mandrel cap-holder
30 Mandrel support column
31 Water cooling coil
32 External water spray ring
33 Internal water spray ring
34 Cut section of ingot
35 Mandrel support bar One embodiment of a furnace for practicing the present process is shown schematically in FIG. 1.

The furnace comprises a refractory tank or crucible 10, enclosed within a furnace chamber 11. The refractory tank may be made for example from bricks of zircon, or yttria-stabilized zirconia, and this contains the fused silica melt 12. This innermost layer of refractory bricks may be surrounded by one or more layers of insulating materials (not shown), comprising bricks, ceramic fiber, zirconia bubble or other suitable materials to provide further insulation and reduce heat losses through the walls of the furnace. The usual constitution of the furnace is known to the person skilled in the art.

Combustible gas (e.g., hydrogen, natural gas, propane or other hydrocarbon gas, or a mixture), and oxygen are provided to one or more burners 13, set in the roof of the furnace which provides a flame or flames projecting downward onto the surface of the melt. Quartz powder 14 (i.e., crystalline or amorphous powder of silica, which may be of natural or synthetic origin) may be added via the one or more burners or introduced by alternative means. Optionally, if it is required to make an ingot of doped quartz glass, the powder may be doped by addition of one or more additional elements, present for example in the form of oxide. The powder may be heated in flight and arrives on the melt surface 12 where it fuses to glass. The powder may be doped by addition of a solid or liquid gas forming agent if it is required to form an opaque quartz glass, but generally the powder is un-doped and of high purity as required to provide a bubble-free fused quartz ingot.

The combustion products leave the furnace through exhaust port 15, and thereafter leave the furnace chamber via chimney 16.

In another embodiment, the powder feed may be supplemented or replaced by a flow of a suitable silicon-containing precursor, preferably a halogen-free precursor, for example a siloxane, such as octamethylcyclotetrasiloxane (OMCT, D4), which may be converted in the flame to a stream of silica microparticles, and deposited on the surface of the melt 14 (as described, for example, in U.S. Pat. No. 6,763, 682).

The temperature of the melt surface 12, and/or of the furnace wall may be measured using one or more optical pyrometers 24, 25, 26, and 27. The interior of the furnace may be viewed through the exhaust port 15.

The furnace may be round, polygonal, or square in cross-section, but preferably conforms to the shape of the required ingot product. Set in the base of the furnace is an orifice 17 which acts as a die and defines the external dimensions of the ingot 18 which is extruded therefrom. The die may be comprised of refractory ceramic material, e.g., yttria-stabilized zirconia or zircon, or may be made from a refractory metal (e.g., tungsten or molybdenum) in which case oxidation-resistance may be promoted by suitably coating the metal surface (e.g., with a coating of the metal silicide etc.), or by provision of an inert or reducing gas environment.

Located within the die orifice 17 is a refractory mandrel which defines the internal dimensions of the hollow ingot. Like the die, the mandrel may be made from refractory ceramic material or may be made from a refractory metal (e.g., tungsten or molybdenum, optionally with a protective coating), and may be operated within a purged gas environment, at least during the early stages of the campaign. In practice, a mandrel cap 28, of molybdenum, supported by a layer of zircon 29, has been found to be satisfactory. The zircon is held in place by the mandrel support column 30. This may comprise a cylindrical pillar of graphite, of refractory ceramic or even water-cooled metal, but it is important that it is able to hold the mandrel centrally within the die, while itself being held in place from the moveable bottom carriage 21.

The glass emerges with high viscosity and, on rapid cooling, the external surface solidifies almost immediately. The ingot extends downward, and is supported by a series of clamps 19A, 19B, 19C mounted on carriages which can move downward at a speed appropriate for the flow of the glass, i.e., equivalent to the powder feed rate, so that the melt within the furnace is maintained at constant depth. As each carriage reaches the lower limit of its traverse, its hold on the ingot is released, and it is moved to its upper limit, when the grip on the ingot is renewed. The ingot is always gripped by two or more sets of clamps, and thus the straightness of the ingot is ensured. At the lower end of the ingot the ingot cutting station 20 is positioned, at which the ingot may be cut to useful lengths, and then removed for further processing.

Suitable cutting means include heavy-duty water-cooled chain or wire saws, and the cutting medium may be a metal-bonded diamond.

Immediately below the die the external surface of the ingot cools by radiation and convection to the surrounding air (or inert/reducing gas if appropriate). Air drawn upwards around the ingot into the furnace chamber 11 may be used to assist cooling (cooling air 23), and this may be further promoted by injecting a high velocity flow of cooling gas, provision of a mist of water droplets etc., if required.

Glass surface temperature in the die region and ingot temperatures beneath the die may be measured by one or more suitable optical pyrometers 24, 25, 26, and 27. Local temperatures may also be measured using thermocouples or alternative methods, if required.

Cooling of the external surface of the ingot may be achieved by convection and radiation to the environment, but prior to cutting it has been found to be useful to cool the ingot additionally by an external water spray, directed from a ring of spray jets 32, located around the ingot, to ensure that the temperature of the external surface of the ingot is reduced to less than ca. 300° C., before cutting with a water-cooled saw.

Cutting and removal of ingot sections must be undertaken without removing the mandrel from the die orifice, and the various stages of this operation are shown schematically in FIGS. 2(A) to 2(D).

The process according to one embodiment is generally commenced with the furnace cavity filled with fragments of fused quartz 12, and the die orifice blocked by a cylindrical bait-piece of fused quartz, held in place by clamps 19A and 19B. After initial melting of the furnace, quartz powder is introduced via the one or more burners 13, and the hollow ingot 18 is drawn downwards, while maintaining the melt level within the furnace approximately constant.

By reciprocal movement of carriages/clamps 19A, 19B and 19C, the ingot is extended downwards until the position shown in FIG. 2(A) is reached, and at that point it becomes necessary to cut off a section of ingot. Prior to the cutting operation, water sprays 32 are applied to reduce the external surface temperature surface of the ingot, and optionally internal water sprays 33 are also activated. Such internal sprays are preferred when dealing with the larger diameter, and thicker walled ingots. After internal and external surfaces have been brought to satisfactory temperatures, and while supporting the lowest section of the ingot with clamp 19C and bottom carriage 21, the ingot is cut through circumferentially, while care is taken not to cut the mandrel support column.

The bottom section of ingot 34 (i.e., the cut section of ingot) may then be lowered sufficiently to permit insertion of one or more mandrel support bars 35, which serve to keep the mandrel in place while the bottom carriage 21 and cut ingot section 34 are lowered to floor level. At that point (FIG. 2 (D)) it is possible to off-load and remove the cut ingot section 34, and it is possible then to raise clamp 19C and attach it to the descending ingot, and to raise bottom carriage 21 and cause it to re-engage with the lower end of the mandrel support column. It is then possible to remove the mandrel support bars 35, and resume the situation depicted in FIG. 2 (A).

It is preferable that this cycle of operations is completed with minimal interruption to the downward motion of the ingot (clamps 19A and 19B).

Embodiment—Apparatus for the Continuous Method for the Production of Hollow Ingots In a second aspect, the present invention relates to an apparatus for the continuous production of hollow quartz-glass ingots. This apparatus is able to carry out the above-mentioned process and comprises the following means:
(a) a crucible or refractory tank for providing a softened quartz-glass mass having a die orifice in the bottom of the crucible or refractory tank;
(b) vertically drawing off the softened quartz-glass mass through a die and a mandrel supported on a column to provide a hollow quartz-glass ingot; and
(c) means for on-line cutting of the hollow quartz-glass ingot to a specific length.

The claimed apparatus is characterized in that the apparatus comprises means for active cooling the internal surface of the hollow quartz-glass ingot.

In a first embodiment, the means for an active cooling the internal surface may be a coil arranged around the mandrel support column, whereby said coil comprises a cooling fluid.

In a second embodiment, the active cooling means might be constituted by the mandrel support column itself which is cooled with a cooling fluid arranged inside the mandrel support column.

In a third embodiment, the cooling means might be constituted by a gas flow of an inert gas, such as nitrogen or argon, in the inner cavity of the hollow quartz-glass ingot.

In a fourth embodiment, the means include provision of a spray of water on the inner surface of the ingot. The active cooling means of the fourth embodiment are preferably applied, alone or in combination with the active cooling means according to the first to third embodiment, during a period immediately before the ingot cutting procedure is initiated.

The operating modes of the cooling means are already described above.

The apparatus according to one embodiment may comprise further components and parts which are mentioned below. The functionality of these additional parts becomes clear by the above-mentioned method description and is summarized shortly as follows:

The claimed apparatus comprises the crucible or refractory tank which is provided preferably with one or more burners in the roof of the crucible or refractory tank and with a die orifice in the bottom of the crucible or refractory tank.

The starting material for the production of the hollow quartz-glass ingot is provided to the crucible or refractory tank usually through the burner which is equipped with supply means for oxygen and a combustible gas, for example hydrogen, natural gas, hydrocarbon gas, and any suitable mixture thereof.

The crucible or refractory tank is usually arranged in a furnace chamber in which they are enclosed.

The refractory tank or crucible may be made for example from bricks of zircon, or yttria-stabilized zirconia, and is suitable to receive the fused silica melt. This innermost layer of refractory bricks may be surrounded by one or more layers of insulating materials, comprising bricks, ceramic fiber, zirconia bubble or other suitable materials to provide further insulation and reduce heat losses through the walls of the furnace.

The starting material of the process, e.g., the quartz powder, may be added via the one or more burners, or introduced by alternative means.

The furnace may be round, polygonal, or square in cross-section, but preferably conforms to the shape of the required ingot product. Set in the base of the furnace is an orifice which acts as a die and defines the external dimensions of the ingot which is extruded therefrom. The die may be comprised of refractory ceramic material, e.g., yttria-stabilized zirconia or zircon, or may be made from a refractory metal (e.g., tungsten or molybdenum) in which case oxidation-resistance may be promoted by suitably coating the metal surface (e.g., with a coating of the metal silicide etc.), or by provision of an inert or reducing gas environment.

The claimed apparatus preferably comprises a refractory mandrel within the die orifice which defines the internal dimensions of the hollow ingot. Like the die, the mandrel may be made from refractory ceramic material, e.g., yttria-stabilized zirconia or zircon or may be made from a refractory metal (e.g., tungsten or molybdenum, optionally with a protective coating), and may be operated within a purged gas environment, at least during the early stages of the process. In practice, a mandrel cap, of molybdenum, supported by a layer of zircon, has been found to be satisfactory.

The claimed apparatus, in addition, comprises a mandrel support column which functions to hold the zircon in place. This may comprise a cylindrical pillar of graphite, of refractory ceramic or even water-cooled metal.

Furthermore, the claimed apparatus comprises moveable carriage(s) and clamps which support the extruded ingot moving downward. The clamps are usually mounted on the carriages. The clamps are configured to hold the extruded ingot and are able to grip and release the ingot. The claimed apparatus preferably comprises at least three clamps to grip the extruded ingot.

The claimed apparatus also comprises an ingot cutting station, at which the ingot may be cut to useful lengths. Suitable cutting means for the claimed apparatus include heavy-duty water-cooled chain or wire saws, and the cutting medium may be a metal-bonded diamond.

The claimed apparatus may also comprise means for cooling the external surface of the hollow quartz-glass ingot, such as a water spray which are arranged above the cutting station of the claimed apparatus.

Moreover, the claimed apparatus comprises means for cooling the ingot directly after being extruded from the die orifice. This means allow cooling of the ingot by radiation and convection of surrounding air, a flow of inert gas, a flow of reducing gas and a mist of water droplets.

Furthermore, the claimed apparatus comprises in general means to cool the internal surface of the ingot such as a cooling coil, cooling of the mandrel support column, and also provision of a spray of water on the inner surface for use during a period prior to cutting of the ingot.

The apparatus may also comprise optical pyrometers, thermocouples or alternative means for the surveillance of the temperature of the extruded ingots at different positions.

Further parts of the claimed apparatus become evident from the detailed description of the claimed process disclosed above.

Embodiment—Hollow Quartz-Glass Ingot

Finally, the present invention relates to the hollow quartz-glass ingots which are prepared according to the above-mentioned process or by using the above-mentioned apparatus, whereby the hollow quartz-glass ingot is cut into sections of a pre-defined length.

The claimed hollow quartz-glass ingots are characterized in that the outside diameter of the ingot is more than 400 mm, more preferably more than 450 mm, at most preferably more than 500 mm.

The claimed hollow quartz-glass ingots are further characterized in that the tensile stress in the ingot is preferably less than 5 MPa, more preferably less than 4 MPa, at most preferably less than 2 MPa.

The claimed hollow quartz-glass ingots are further characterized in that the cross-sectional area of the ingot is preferably greater than 6000 $mm^2$, more preferably greater than 9000 $mm^2$, at most preferably greater than 11000 $mm^2$.

One embodiment in particular relates to a method for producing a hollow quartz-glass ingot as described above and to a hollow quartz-glass ingot as such which has the following constitution:

Embodiment 1

(a) outside diameter of 325 to 375 mm, specifically 330 to 370 mm, more specifically 335 to 365 mm, more specifically 340 to 360 mm, more specifically 345 to 355 mm, more specifically 350 mm; and
(b) inside diameter of 175 to 225 mm, more specifically 180 to 220 mm, more specifically 185 to 215 mm, more specifically 190 to 210 mm, more specifically 195 to 205 mm, more specifically 200 mm; and
(c) cross-sectional area of 62500 $mm^2$ to 67500 $mm^2$, more specifically 63000 to 67000 $mm^2$, more specifically 63500 to 66500 $mm^2$, more specifically 64000 to 66000 $mm^2$, more specifically 64500 to 65500 $mm^2$, more specifically 64795 $mm^2$.

Embodiment 2

(a) outside diameter of 375 to 425 mm, specifically 380 to 420 mm, more specifically 385 to 415 mm, more specifically 390 to 410 mm, more specifically 395 to 405 mm, more specifically 396 mm; and
(b) inside diameter of 225 to 275 mm, more specifically 230 to 270 mm, more specifically 235 to 265 mm, more specifically 240 to 260 mm, more specifically 245 to 255 mm, more specifically 250 mm; and
(c) cross-sectional area of 71500 $mm^2$ to 76500 $mm^2$, more specifically 72000 to 76000 $mm^2$, more specifically 72500 to 75500 $mm^2$, more specifically 73000 to 75000 $mm^2$, more specifically 73500 to 74500 $mm^2$, more specifically 74076 $mm^2$.

Embodiment 3

(a) outside diameter of 435 to 485 mm, specifically 440 to 480 mm, more specifically 445 to 475 mm, more specifically 450 to 470 mm, more specifically 455 to 465 mm, more specifically 460 mm; and
(b) inside diameter of 215 to 265 mm, more specifically 220 to 260 mm, more specifically 225 to 255 mm, more specifically 230 to 250 mm, more specifically 235 to 245 mm, more specifically 240 mm; and
(c) cross-sectional area of 118500 $mm^2$ to 123500 $mm^2$, more specifically 119000 to 123000 $mm^2$, more specifically 119500 to 122500 $mm^2$, more specifically 120000 to 122000 $mm^2$, more specifically 120500 to 121500 $mm^2$, more specifically 120951 $mm^2$.

Embodiment 4

(a) outside diameter of 475 to 525 mm, specifically 480 to 520 mm, more specifically 485 to 515 mm, more specifically 490 to 510 mm, more specifically 495 to 505 mm, more specifically 502 mm; and
(b) inside diameter of 305 to 355 mm, more specifically 310 to 350 mm, more specifically 315 to 345 mm, more specifically 320 to 340 mm, more specifically 325 to 335 mm, more specifically 330 mm; and
(c) cross-sectional area of 110000 $mm^2$ to 145000 $mm^2$, more specifically 110500 to 140000 $mm^2$, more specifically 111000 to 135000 $mm^2$, more specifically 115000 to 130000 $mm^2$, more specifically 112000 to 112500 $mm^2$, more specifically 112394 $mm^2$.

Specific examples of hollow quartz-glass ingots are as follows:

| Outside Diameter mm | Inside Diameter mm | CSA $mm^2$ |
|---|---|---|
| 350 | 200 | 64795 |
| 396 | 250 | 74076 |
| 460 | 240 | 120951 |
| 502 | 330 | 112394 |

The presently described embodiments are described in more detail with regard to the following example:

The example is carried out in an apparatus which is described in FIGS. 1 and 2.

The height of the chimney 16 beneath the furnace was 228 mm and, in this trial, chimney ventilation ports were not open.

The hollow ingot descended through the furnace floor and was transported by reciprocal movement of clamps 19. The ingot was fully exposed, and in the absence of any external insulation, it was cooled externally by radiation and convection to the surrounding air. The mandrel 28 comprised a mandrel cap 28 of molybdenum, of diameter 330 mm which was supported on a cap-holder 29 of zircon refractory, and this in turn was supported on the mandrel support column 30 which was 3000 mm long and made from graphite. Mounted around this column was a water-cooled copper coil 31, which extended from approximately 1300 mm to 2000 mm as measured from the base of the mandrel.

Except during cutting and removal of the cut ingot section (FIG. 2B to 2D), water flowed continuously through this coil, providing essential heat removal from within the ingot.

The internal water spray ring 33 was mounted 50 mm below this coil, and this provided an internal spray of water in the period immediately before cutting an ingot section.

Outside the ingot, and at a distance of approximately 1500 mm below the die was another water spray ring, which again was supplied with water for a period immediately prior to the ignition of an ingot cutting operation.

The cutting station was approximately 1800 mm below the die.

During the manufacture of the hollow ingot with an outer diameter of 502 mm and an inner diameter of 330 mm the ingot descended at a rate of approximately 35 mm/h, and was intermittently cut to lengths of approximately 1100 mm. The use of the internal and external cooling systems was as described below.

Water was continuously supplied to the internal cooling coil (6 liters/minute, at ca. 20° C.), and was turned off only during removal of each cut ingot section. Approximately 240 minutes before initiating a cut, the internal water-spray ring was supplied with water (1.6 liters/minute at ca. 60° C.) to enhance the internal cooling of the ingot. And later (approximately 180 minutes before the cut), the external water-cooling spray was initiated (1.6 liters/minute at ca. 60° C.). The internal and external sprays were continued until cutting of the ingot was about to start, when both sprays were suspended.

Under these circumstances it was possible repeatedly to cut the descending ingot into sections 1100 mm long with no significant cracks being induced in the surface of the ingot. Earlier attempts to cut such a large ingot hollow ingot on-line led to the formation of longitudinal cracks in the ingot, and such cracks were found to grow continuously as the ingot descended rendering the product useless for the purpose intended.

Critical in this development of large hollow ingots with relatively thick walls, has been the provision of internal cooling as provided by the cooling coil. As sizes to be manufactured have increased this internal cooling has been supplemented at specific times with the internal water sprays, with the purpose of minimizing the difference in temperature of the inner and outer surfaces of the ingot at the time of cutting.

The outside temperature at the cutting plane is typically 170-210° C. before cooling but reduces to ca. 100° C. after cooling. The bore temperature is difficult to measure at the cutting plane prior to cutting the ingot, but without cooling the bore temperature may as high as 450° C., even with the cooling provided by the cooling coil. With the additional cooling provided by the water spray the internal surface temperature is reduced typically to less than 340° C.

The invention claimed is:

1. A method for producing a hollow quartz-glass ingot, characterized by the following process steps:
   a. providing a softened quartz-glass mass in a crucible or refractory tank;
   b. vertically drawing off the softened quartz-glass mass through a die in which is mounted a mandrel, to provide a hollow quartz-glass ingot; and
   c. on-line cutting of the hollow quartz-glass ingot to a specific length,
   characterized in that the internal surface of the hollow quartz-glass ingot is cooled by active means after vertically drawing off the softened quartz-glass mass in step b. and before on-line cutting in process step c.

2. The method according to claim 1, characterized in that step b. is carried out with a mandrel mounted on a mandrel support column, and the internal surface of the hollow quartz-glass ingot is cooled by one or more of the following means
   1) by a coil arranged around the mandrel support column, whereby said coil comprises a cooling fluid;
   2) by the mandrel support column itself which is cooled with a cooling fluid arranged inside the mandrel support column;
   3) by a gas flow of an inert gas in the inner cavity of the hollow quartz-glass ingot; and/or
   4) by a water spray issuing as multiple jets or as an atomized mist of fine droplets.

3. A method according to claim 1, wherein the mandrel is supported from below on a mandrel support column, and means are provided to hold the mandrel in place temporarily while said column is detached from the bottom carriage and each cut ingot section is removed, and said column is subsequently reattached to the bottom carriage.

4. The method according to claim 1, characterized in that the external surface of the hollow quartz-glass ingot is cooled by enhancing active means of a cooling gas, a cooling fluid, active convection and/or radiation.

5. The method according to claim 1, characterized in that the hollow quartz-glass ingot is cooled to a temperature of the internal surface of the hollow quartz-glass ingot of less than 400° C. prior to prior to the on-line cutting in process step c.

6. The method according to claim 1, characterized in that the hollow quartz-glass ingot is cooled to a temperature of the external surface of the hollow quartz-glass ingot of less than 400° C. prior to cutting in process step c.

7. The method according to claim 1, characterized in that the temperature difference between the internal surface and the external surface of the hollow quartz-glass ingot at the cutting zone is less than 300° C.

8. The method according to claim 1, characterized in that the total stress of the hollow quartz-glass ingot prior to the cutting in step c. is reduced to less than 5 MPa.

9. The method according to claim 1, characterized in that the process step c. is carried out in a cutting station being spaced 1800 mm to 4000 mm from the die orifice along the hollow quartz-glass ingot extruded from the die orifice.

* * * * *